United States Patent [19]
Lyon

[11] Patent Number: 5,827,496
[45] Date of Patent: *Oct. 27, 1998

[54] METHODS AND SYSTEMS FOR HEAT TRANSFER BY UNMIXED COMBUSTION

[75] Inventor: Richard K. Lyon, Pittstown, N.J.

[73] Assignee: Energy and Environmental Research Corp., Irvine, Calif.

[*] Notice: This patent issued on a continued prosecution application filed under 37 CFR 1.53(d), and is subject to the twenty year patent term provisions of 35 U.S.C. 154(a)(2).

[21] Appl. No.: 834,435

[22] Filed: Apr. 16, 1997

Related U.S. Application Data

[63] Continuation of Ser. No. 428,032, Apr. 25, 1995, abandoned, which is a continuation-in-part of Ser. No. 270,157, Jun. 30, 1994, Pat. No. 5,509,362, which is a continuation-in-part of Ser. No. 990,880, Dec. 11, 1992, Pat. No. 5,339,754.

[51] Int. Cl.⁶ ........................................................ F23B 7/00
[52] U.S. Cl. ...................... 423/659; 423/351; 423/648.1; 423/652; 165/104.11; 165/104.12; 431/2
[58] Field of Search .................................... 110/246, 342, 110/345, 346; 165/104.11, 104.12, 104.13; 423/213.2, 245.3, 653, 659, 648.1, 652; 588/202; 431/2

[56] References Cited

U.S. PATENT DOCUMENTS

| | | | |
|---|---|---|---|
| 1,128,804 | 2/1915 | Mittasch et al. | 423/653 |
| 1,711,036 | 4/1929 | Beekley | 423/653 |
| 1,973,590 | 9/1934 | Weaton et al. | 23/148 |
| 2,565,395 | 8/1951 | Scharmann | 423/659 |
| 3,690,550 | 9/1972 | Hilberath et al. | 237/81 |
| 4,388,877 | 6/1983 | Molayem et al. | 110/342 |
| 4,400,356 | 8/1983 | McVay et al. | 422/171 |
| 5,130,100 | 7/1992 | Serizawa | 422/180 |
| 5,339,754 | 8/1994 | Lyon | 110/345 |
| 5,653,106 | 8/1997 | Katashiba et al. | 60/300 |

FOREIGN PATENT DOCUMENTS

| | | |
|---|---|---|
| 49-51189 | 5/1974 | Japan . |
| 58-156192 | 9/1983 | Japan .................................. 165/104.12 |
| 59-102801 | 6/1984 | Japan ....................................... 423/653 |
| 706 102 | 1/1980 | Russian Federation . |
| 2 272 430 | 5/1994 | United Kingdom . |

OTHER PUBLICATIONS

Yang et al., "Reactor Trap to Remove Hydrocarbons From Engine . . . " Environ. Sci. Technol. vol. 26 No. 8 pp. 1561–1564 (1994, no month).

Ishida, M. et al., *A Novel Combustor Based on Chemical–Looping Reactions and Its Reaction Kinetics*, Journal of Chemical Engineering of Japan, vol. 27, No. 3, pp. 296–301 (Jun. 1994).

Bhattacharyya, et al., *Catalytic Sox Abatement of FCC Flue Gases*, Preprints of Papers Presented at the 194th Nat'l Meeting of the American Chemical Society, vol. 32, No. 4 (Aug. 31–Sep. 4, 1987).

(List continued on next page.)

*Primary Examiner*—Gary P. Straub
*Assistant Examiner*—Timothy C. Vanoy
*Attorney, Agent, or Firm*—Workman, Nydegger & Seeley; Gregory M. Taylor, Esq.

[57] ABSTRACT

An improved methods and systems are provided for transferring heat in a combustion system. The methods and systems provide for alternately exposing a reducing gas and a gas containing molecular oxygen to an unmixed combustion catalyst to respectively reduce and oxidize the unmixed combustion catalyst. The unmixed combustion catalyst is readily reducible when in its oxidized state and is readily oxidized when in its reduced state. The alternating reduction and oxidation reactions enable the unmixed combustion catalyst to efficiently release heat to a heat receiver in efficient thermal contact with the unmixed combustion catalyst. In most embodiments of the present invention, the unmixed combustion catalyst is in a reactor bed of a combustion system.

32 Claims, 6 Drawing Sheets

OTHER PUBLICATIONS

Ishida, et al., *Evaluation of a Chemical–Looping–Combustion Power–Generation System by Graphic Exergy Analysis*, Energy, vol. 12, No. 2, 147–154 (1987). No month.

Lemieux, et al., *Minimization of Transient Emissions from Rotary Kiln Incinerators*, Prepared for Submission to Combustion Science and Technology, Aug. 2, 1989, (Revised Jan. 5, 1990).

Lyon, *Unmixed Combustion: A New tehcnology For Prevention of Puffing By Rotary Kiln Incinerators and Other Applications*, American Chemical Society, vol. 38, No. 2, Preprints of Papers Presented at the 205th ACS National Meeting in Denver, Colorado (Mar. 28–Apr. 2, 1993).

Richter, et al., *Reversibility of Combustion Processes*, Second Law Analysis of Processes, ACS Symposium Ser. 235, 71–86 (1983) No month.

*Chemical Abstracts*, vol. 100, 174 (1984). (No month given).

Wendt, et al., *Mechanisms Governing Transients from the Batch Incineration of Liquid Wastes in Rotary Kiln*, Combustion Science and Technology, vol. 61, 169–185 (1988). No month.

Wendt, et al., *Prediction of Transient Behavior During Batch Incineration of Liquids Wastes in Rotary Kiln*, Hazardous Waste & Hazardous Materials, Liebert, Inc. Publ., vol. 7, No. 1 (1990). Nov.

Curran et al., *$CO_2$ Acceptor Gasification Process: Studies of Acceptor Properties*, Advances in Chemistry Series 69, American Chemical Society, pp. 141–165 (Sep. 1966).

Bett et al., Power Systems Div. United Technologies Corp., *Evaluation of Adiabatic Reformer In Mixed–Gas–Cycle*, Department of Defense Report No. AD–A134224 (Jun. 1983).

METHODS AND SYSTEMS FOR HEAT TRANSFER BY UNMIXED COMBUSTION

RELATED APPLICATIONS

The present application is a continuation of U.S. application Ser. No. 08/428,032, filed Apr. 25, 1995 now abandoned, which is a continuation-in-part of U.S. application Ser. No. 08/270,157 entitled "Method and Apparatus for Unmixed Combustion as an alternative to fire" filed Jun. 30, 1994 which issued as U.S. Pat. No. 5,509,362 on Apr. 23, 1996. U.S. application Ser. No. 08/270,157 is a continuation-in-part of U.S. application Ser. No. 07/990,880, filed Dec. 11, 1992, which issued as U.S. Pat. No. 5,339,754 on Aug. 23, 1994.

BACKGROUND OF THE INVENTION

1. Field of the Invention

The invention relates generally to methods and systems for producing heat by oxidizing fuels with air without mixing the fuel with the air and thereby producing a fire. More particularly, the invention is directed to methods and systems for generating heat by oxidizing fuel without mixing the fuel with air with the subsequent transfer of the generated heat being an improvement over the heat transfer which is possible when fire is used to produce heat.

2. Background Art

Historically, the primary method by which mankind has used fuel to generate heat has been fire. For many applications, however, the use of fire to produce heat has a number of substantial disadvantages and limitations.

One of the limitations of fire is that mixtures of fuel and air must contain more than some critical amount of fuel in order to burn. This is the well known flammability limit.

Another of the limitations of fire relates to its thermodynamics, i.e., fire is an irreversible process. While energy can neither be created or destroyed it can become less available for doing useful work. A fuel contains chemical energy some fraction of which is potentially available to do useful work. Upon combustion of a fuel by fire the chemical energy is converted into heat energy. The fraction of this heat energy which is potentially available to do useful work is less than the fraction of the chemical energy which was potentially available to do useful work.

A third disadvantage of fire relates to heat transfer. Combustion produces hot gases for all fuels in common usage. In many applications, it is necessary to recover heat from these hot gases. This is commonly done by passing the hot gases over heat transfer surfaces, but the efficiency of the heat transfer process between hot gases and solid surfaces is generally relatively low. Thus, to recover the heat efficiently, large amounts of heat transfer surface are needed. For industrial processes using fire as a heat source, the cost of providing heat transfer surfaces to recover the heat is frequently a major part of the total process cost.

Fire also has the property of being an intense phenomenon. For a flame to sustain itself, large amounts of heat must be liberated at very high temperatures with a very high rate of heat liberation per unit volume. In many applications this is a disadvantage since in these applications heating in a more controlled manner is needed. For these applications electrical heating is frequently used.

A number of alternatives to fire have been proposed in efforts to overcome one or another of fire's disadvantages. The flammability limits are a problem in some situations, i.e., there are industrial operations which produce mixtures of a toxic organic material with air. These mixtures must be disposed of in an environmentally acceptable manner but frequently they are below the flammability limit and hence will not sustain a fire. One frequently used solution to this problem is the use of catalytic incineration wherein the mixture of air and toxic organic matter is passed through an oxidation catalyst.

An alternative to fire was proposed by H. J. Richter and K. F. Knoche in the following article: *Reversibility of Combustion Processes, in Efficiency and Costing, Second Law Analysis of Process*, 235 ACS Symposium 71–86 (R. A. Gaggioli ed., 1983). The teachings of this reference are restricted to providing improvement of thermodynamic efficiency and the reference does not teach, show, or suggest any means for improving heat transfer.

Fluid bed combustion is also an alternative to fire. In some applications fluid bed combustion can provide better heat transfer than can fire. In other applications, the use of fluid bed combustion does not avoid some substantial heat transfer problems.

One example of an application with substantial heat transfer problems is the industrial process known as steam reforming in which hydrogen is produced by passing steam and a hydrocarbon through a nickel catalyst. Steam reforming is typically done at temperatures in a range of 700° C. to about 800° C. and at pressures in a range of about 100 to about 700 psig. These conditions are too severe for the use of reaction vessels made of mild steel or even stainless steel. A high nickel alloy such as inconel must be used despite the great cost of such an alloy. Furthermore, heat must be supplied since the reaction is highly endothermic. While the necessary heat can readily be generated by burning fuel, it is difficult to transfer this heat to where it is needed since the catalyst is in the form of a packed bed. Packed beds are poor conductors of heat and the outer sections of the bed tend to insulate the inner sections. In order to get an adequate rate of heat transfer to the interior of the reaction vessel, the reaction vessels used are long narrow tubes. Thus to get an adequate rate of heat transfer it is necessary to use very large amounts of expensive alloy tubing.

To avoid this disadvantage there have been proposals in the art to do what is called "adiabatic" steam reforming. Department of Defense report number AD-A134224, "Evaluation of Adiabatic Reformer in Mixed-Gas-Cycle", by the Power Systems Division of United Technologies Corporation is a typical example of this technology. In this approach, the heat necessary for the endothermic steam reforming reaction is provided by adding some air to the steam hydrocarbon mixture passing through the reactor. The oxygen in the air reacts with the hydrocarbon, liberating heat. Unfortunately, however, combustion is an "all or nothing" process. If ignition does not occur, the needed heat is not liberated. If ignition does occur, heat is liberated not throughout the reactor where it is needed but at the point of ignition. Since the heat is not liberated uniformly throughout the reactor, there is again a severe heat transfer problem.

The gasification of coal with water is, like steam reforming, an endothermic reaction. A proposal for the improvement of this endothermic reaction has been advanced by G. P. Curran, C. E. Fink, and E. Gorin of the Consolidated Coal Co. in the following article: $CO_2$ Acceptor Gasification Process, in Fuel Gasification, 69 ACS Advances in Chemistry Series 141–164. In this article, which is typical of the art, the use of CaO as an acceptor for $CO_2$ is suggested. The reaction, $CO_2+CaO=CaCO_3$, is highly exothermic, thereby supplying the heat consumed by the endothermic gasification reaction. Furthermore, $CO_2$ and CO are in equilibrium via the water gas shift reaction, $H_2O+CO=CO_2+H_2$. Consequently, removing the $CO_2$ has the effect of also removing the CO, allowing the production of a gas containing a large mole fraction of hydrogen. Unfortunately, however, for this process to be practical it is necessary to reconvert the $CaCO_3$ back to CaO. The heat necessary to do this can readily be generated by burning some fuel; however, transferring that heat to where it is needed is again a difficult and expensive problem.

Heat transfer is also a substantial problem in other industrial processes in which packed bed reactors are used to carry out endothermic reactions. Examples of such reactions include but are not limited to the cracking of ammonia to make hydrogen/nitrogen mixtures, the gasification of biomass, the catalytic reforming of petroleum hydrocarbons, and the decomposition of methanol.

Another group of applications in which heat transfer is a substantial problem involves the use of packed beds of sorbents. Typically a gas containing some impurity is passed through the packed bed, the impurity being removed by adsorption or absorption onto a sorbent. When the sorbent approaches saturation with the impurity, the sorbent must be regenerated. This is commonly done by heating the packed bed to drive out the impurity. Since, however, the outer portions of the bed tend to insulate the inner portions, heat transfer is not effectively achieved.

Yet another example of a technological problem for which presently available combustion and heat transfer technology do not provide a satisfactory solution is the production of shale oil. The United States has vast reserves of what is commonly referred to as oil shale, i.e., deposits of rock which yield oil when sufficiently heated. No economically acceptable method of producing oil from this resource is presently available because of the limitations of presently available combustion and heat transfer technology. For example, when shale rock is placed into a packed bed retort and heat is supplied to the exterior of the retort, the outer layers of the shale rock insulate the inner layers. This results in unacceptably slow rates of heat transfer and liberation of the oil from the rock. In principal, use of a fluid bed retort should provide a much higher rate of heat transfer, but shale rock, once it is retorted, has a tendency to crumble into fine powder. This fine powder tends to fly out of the fluid bed, making its operation quite difficult.

From the examples above it is clear that there is a need in the art for a new method of burning fuel which allows more effective heat transfer than is possible with fire and the presently available alternatives to fire.

SUMMARY AND OBJECTS OF THE INVENTION

A principle object of the present invention is to provide a novel combustion system providing a more rapid transfer of the heat liberated by the combustion process. In one embodiment the heat is used for heating a bed of solids, such as catalysts.

Another object of the invention is to provide a novel combustion system providing a more rapid transfer of the heat liberated by the combustion process to a packed bed of a sorbent thereby allowing the sorbent to be regenerated.

Still another object of the invention is to provide a novel combustion system allowing the production and transfer of heat in a readily controlled manner.

Yet another object of the invention is to provide a novel method of supplying startup heat for systems which operate at temperatures above ambient conditions.

Additional objects and advantages of the invention will be set forth in the description which follows, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein methods and systems have been developed for transferring heat in a combustion system. The methods and systems provide for alternately exposing a reducing gas and a gas containing molecular oxygen to an unmixed combustion catalyst to respectively reduce and oxidize the unmixed combustion catalyst. The unmixed combustion catalyst is readily reducible when in its oxidized state and is readily oxidized when in its reduced state. The alternating reduction and oxidation reactions enable the unmixed combustion catalyst to efficiently release heat to a heat receiver in efficient thermal contact with the unmixed combustion catalyst. More specifically, the present invention enables fuel to be oxidized without the necessity of mixing it with air by alternately passing the fuel and air through a bed of an unmixed combustion catalyst.

In one embodiment of the invention, methods and systems are provided for supplying heat to packed bed catalytic reactors in which endothermic reactions are carried out. The unmixed combustion catalyst may serve as a catalyst for the endothermic reaction or it may be mixed with a second catalyst and placed in the reactor. Since the two catalysts are in intimate contact, the heat generated by the alternate oxidation and reduction of the unmixed combustion catalyst is readily transferred to the endothermic reaction catalyst. Since the unmixed combustion catalyst can be uniformly distributed throughout the packed bed, the packed bed can be uniformly heated.

Furthermore if, during each cycle, the amounts of fuel and air passed through the reactor are respectively sufficient to fully reduce and fully oxidize the unmixed combustion catalyst, the amount of heat liberated in any volume of the reactor will be uniform and accurately defined. Specifically the heat liberated per cycle will be the concentration of the unmixed combustion catalyst multiplied by the sum of the heats of oxidation and reduction of the unmixed combustion catalyst. Thus, by choosing an appropriate concentration for the unmixed combustion catalyst the rate of heat input to reactor can be controlled to whatever level is desired.

In another embodiment of the invention, methods and systems are provided for supplying heat to a packed bed of a sorbent to thermally regenerate the sorbent. The unmixed combustion catalyst is placed in the packed bed in contact with the sorbent.

In another embodiment of the invention, methods and systems are provided for supplying startup heat for systems which operate at temperatures above ambient conditions and which operate intermittently.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not, therefore, to be considered to be limiting of its scope, the invention will be described and explained with additional specificity and detail through the use of the accompanying drawings in which.

DETAILED DESCRIPTION OF THE PREFERRED EMBODIMENTS

The present invention relates to methods and systems for efficiently transferring heat within combustion systems. In accordance with the methods and systems of the present invention, an unmixed combustion catalyst is placed in efficient thermal contact with a heat receiver. The term "unmixed combustion catalyst" as used in the specification and the appended claims is a material which is readily reducible when in its oxidized state and is readily oxidized when in its reduced state. The unmixed combustion catalyst is alternately contacted with a reducing gas to reduce the unmixed combustion catalyst and with a gas containing molecular oxygen to oxidize the unmixed combustion catalyst in order to release and transfer heat to the heat receiver. Various configurations are provided for alternately exposing the reducing gas and the gas containing molecular oxygen to the unmixed combustion catalyst to respectively reduce and oxidize the unmixed combustion catalyst. More specifically, the present invention relates primarily to oxidizing fuels in combustion systems wherein heat can be transferred more effectively to packed bed reactors.

In one embodiment, the present invention involves a process for steam reforming fuels into hydrogen in a packed bed reactor wherein heat is more efficiently transferred to the packed bed reactor. In an additional embodiment of the present invention, methods and systems are provided for oxidizing fuel in combustion systems wherein heat can be transferred more effectively to a packed bed of sorbent materials. Combustion methods and systems are also provided in another embodiment of the present invention, wherein heat is generated on a surface and the rate of heat generation on each section of that surface can be accurately controlled. In yet another embodiment of the present invention, combustion methods and systems are provided wherein heat is generated within a volume and the rate of heat generation on each portion of that volume can be accurately controlled.

Although all combustion systems may be within the scope of the present invention, for the sake of clarity and example, the present invention is set forth hereinbelow by providing specific examples of the present invention as related to packed bed catalytic reactors, packed bed sorbent systems, and surface heaters. The specific teachings of the present invention can, however, be applied to any combustion system.

A. Mass Transfer Catalysis vs. Chemical Reaction Catalysis

The present invention is directed to methods and systems for effecting oxidation in a combustion device, such as supplying heat to a packed bed catalytic reactor in which an endothermic reaction is carried out. It is a feature of the present invention to use a mass transfer catalyst to oxidize fuel.

Mass transfer catalysis should be considered in contrast to the common chemical reaction catalysis such as exemplified by the pollution control systems used in automobiles. The exhaust coming out of the engine contains CO and unburned hydrocarbons. Depending on the air to fuel ratio at which the engine is operating, the exhaust gas may also contain oxygen. If it does not contain oxygen, air is added to the exhaust which is passed through a noble metal catalyst. The amount of air added needs to be accurately controlled. If too much cold air is added, the temperature of the air/exhaust gas mixture will be too low and the catalyst will not be able to cause complete reaction. On the other hand if too little air is added it will not be sufficient for complete reaction of the CO and unburned hydrocarbons, and some of these will be discharged unoxidized to the atmosphere.

The noble metals of iridium, platinum, palladium, rhodium, and rhenium are some of the most effective catalysts for the chemical reaction of oxidation. These noble metals are so effective that noble metal catalysts commonly contain extremely small amounts of the noble metal, i.e., noble metal catalysts containing only 0.01 weight percent noble metal or less are common. Thus, when air and exhaust gas are passed through a noble metal catalyst, the noble metal promotes the oxidation reaction but it does not store a significant quantity of oxygen since there is not enough of it present for such storage. If at any instant the air supplied is not adequate for complete combustion, the combustion will be incomplete.

Unlike chemical reaction catalysts, a mass transfer catalyst facilitates the mass transfer of a reactant, an entirely different type of action. The present invention utilizes a mass transfer catalyst to oxidize fuel in various combustion systems, i.e., the present invention uses a an unmixed combustion catalyst.

The preferred readily oxidized/readily reduced materials for the present invention include silver/silver oxide, copper/copper oxide, iron/iron oxide, cobalt/cobalt oxide, tungsten/tungsten oxide, manganese/manganese oxide, molybdenum/molybdenum oxide, strontium sulfide/strontium sulfate, barium sulfide/barium sulfate, and mixtures thereof. The preferred temperature range for each readily oxidized material/readily reduced material is: from about 200° C. to about 700° C. for silver/silver oxide; from about 200° C. to about 1000° C. for copper/copper oxide; from about 500° C. to about 1200° C. for iron/iron oxide, cobalt/cobalt oxide, nickel/nickel oxide, and mixtures thereof; from about 800° C. to about 1300° C. for tungsten/tungsten oxide, manganese/manganese oxide, molybdenum/molybdenum oxide, and mixtures thereof; and from about 600° C. to about 1200° C. for strontium sulfide/strontium sulfate, barium sulfide/barium sulfate, and mixtures thereof.

In some embodiments of the present invention, the unmixed combustion catalyst is supported on a porous ceramic. The porous ceramic is preferably selected from the group consisting of silica, alumina, magnesia and mixtures thereof. The preferred porous ceramic is alumina.

B. Supplying of Heat to Packed Bed Sorbent Systems

A wide variety of small scale commercial activities also produce streams of air contaminated with volatile organic compounds (VOCs). These include dry cleaning, fish canneries, coffee roasting, animal matter rendering, meat smokehouses, fertilizer processing, varnish cookers, and numerous others. Discharging these VOCs into the atmosphere contributes to air pollution in general and specifically to the problem of photochemical smog. In accordance with the present invention, these small scale operations can easily remove the VOCs by passing the contaminated air through a bed of a sorbent such as granulated activated charcoal. Once the sorbent bed becomes saturated with the VOCs, regeneration is necessary. For small scale operations the prior art offers no method of regeneration which is not excessively expensive.

Figure 1:
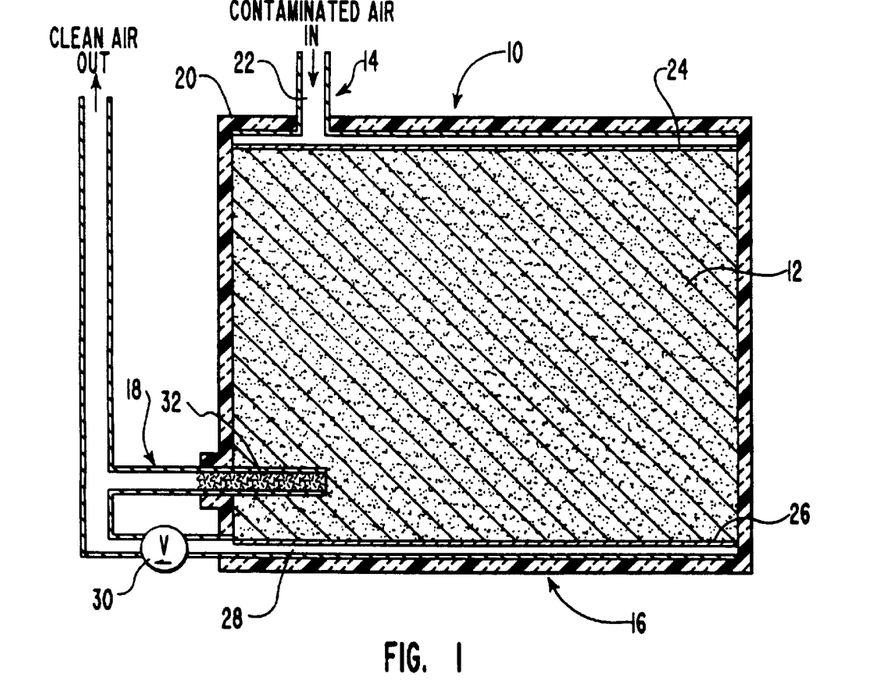
FIG. 1 illustrates a packed bed sorbent system of the present invention for purifying air contaminated with organic vapors.

One embodiment of the present invention, which is particularly useful with the previously described small commercial operations is a packed bed sorbent system for oxidizing an organic compound. As shown in FIG. 1, this embodiment comprises a container 10 surrounding a sorbent bed 12 and having a gas inlet shown generally at 14, a low flow resistance outlet shown generally at 16 and a high flow resistance outlet shown generally at 18. Bed 12 contains a sorbent such as granulated activated charcoal mixed with an unmixed combustion catalyst such as copper oxide. The unmixed combustion catalyst is preferably supported on a porous ceramic such as a high surface area alumina. Container 10 is also preferably covered with insulation 20.

Gas inlet 14, low flow resistance outlet 16 and high flow resistance outlet 18 are in communication with bed 12. Gas inlet 14 preferably comprises an inlet passage 22 in communication with a porous metal inlet plate 24. Low flow resistance outlet 16 is configured to allow large volumes of gas to pass through low flow resistance outlet 16 with a relatively low pressure drop. In the preferred embodiment, low flow resistance outlet comprises a porous metal outlet plate 26 positioned at an opposing end of bed 12 relative to porous metal inlet plate 24 and in communication with outlet passage 28. Low flow resistance outlet 16 also has a valve 30 to close low flow resistance outlet 16 and prevent the flow of gas through low flow resistance outlet 16. With valve 30 open, air contaminated with organic vapors flows through porous metal inlet plate 24, down through bed 12 and out through porous metal outlet plate 26. The adsorbent captures the vapors, and clean air flows out of bed 12. The size of bed 12 is chosen so that its adsorption capacity is somewhat greater than the amount of contaminants entering it during the course of a normal day's operation.

High flow resistance outlet 18 has a heater means for heating the unmixed combustion catalyst when in an oxidized state. The heater means initiates a reaction between the unmixed combustion catalyst and the organic compound. The heat is transferred to the sorbent which acts as a heat receiver and is at least partially saturated with an organic compound.

An example of a heater means within the scope of the present invention is provided by an electric heater 32. Electric heater 32 is a hollow cylindrical heater which preferably has an exterior wrapped lightly with insulation 20. The interior of the section of high flow resistance outlet 18 heated by electric heater 32 is packed with an unmixed combustion catalyst, such as CuO, on alumina. Because high flow resistance outlet 18 has a much greater resistance to flow than does porous metal outlet plate 26, nearly all of the flow passes through porous metal outlet plate 26. At the end of the day's operation, however, heater 32 is turned on and valve 30 is closed. The unmixed combustion catalyst inside electric heater 32 becomes hot more quickly than does the mixture of adsorbent and unmixed combustion catalyst which surrounds heater 32 since insulation 20 surrounds heater 32 as well as container 10. After the unmixed combustion catalyst inside heater 32 becomes hot, the portion of the surrounding bed 12 which is in the immediate vicinity of heater 32 also becomes hot. The adsorbent releases the captured contaminant which the heated unmixed combustion catalyst immediately oxidizes to $CO_2$ and water. This liberates more heat, warming the surrounding regions of the bed, liberating more organic matter which oxidizes, releasing still more heat, etc.

As the region of bed 12 which is hot expands, $CO_2$ and water vapor are produced and flow out through heater 54. Any organic matter this $CO_2$ and water vapor may contain is oxidized by the unmixed combustion catalyst in heater 54. Thus bed 1 is regenerated without allowing any of the adsorbed organic matter to escape.

C. Radiant Heater Systems

In many manufacturing operations (e.g., metal finishing, ceramics firing, and glass manufacture) radiant heaters are used. These heaters are in some instances combustion powered systems, while in others they are electrically powered. While electrical heat is much more expensive than heat from combustion, the electrically powered radiant heaters have the advantage that they provide a far more uniform heat flux than is possible with the combustion powered systems of the prior art.

Figure 2:
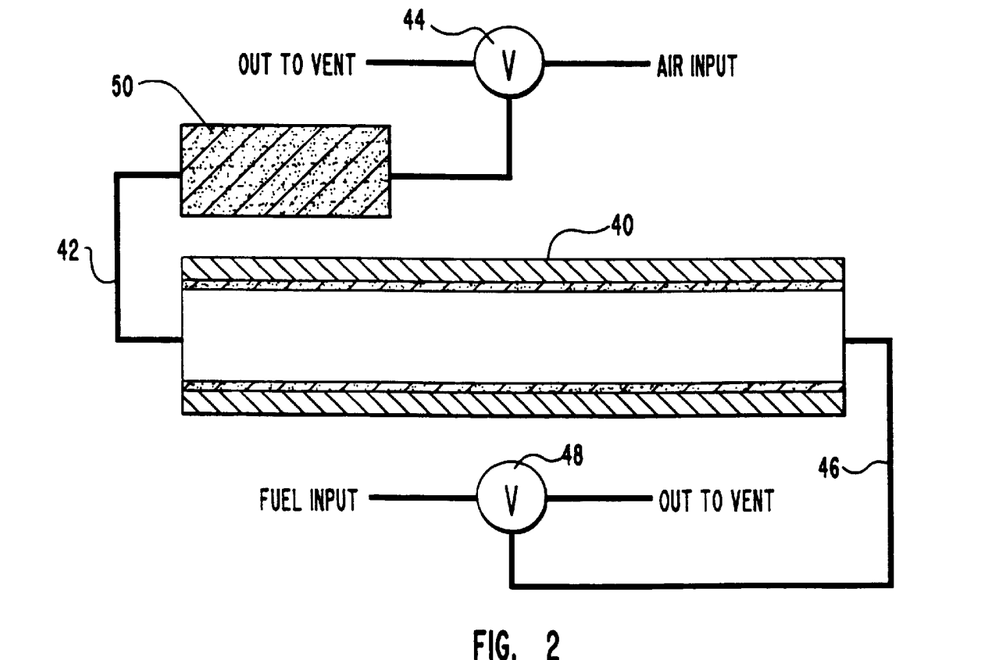
FIG. 2 illustrates a radiant heater system of the present invention for providing highly uniform radiant heating.

In another embodiment of the present invention, a novel radiant heater system is provided which allows a combustion powered system to provide a highly uniform heat flux previously possible only with electrical heating. FIG. 2 depicts a radiant heater system capable of providing radiant heat in a highly uniform and controlled manner through unmixed combustion.

The radiant heater system comprises a ceramic tube 40 having an interior with a uniform coating of unmixed combustion catalyst. A gas flow line 42 is in communication with one end of the interior of ceramic tube 40 and with a three way valve 44. A second gas flow line 46 is in communication with the other end of the interior of ceramic tube 40 and with a second three way valve 48. The radiant heater system may optionally further comprise a bed 50 in communication with gas flow line 42 and containing additional unmixed combustion catalyst. The bed is preferably positioned between ceramic tube 40 and three way valve 44.

Combustion is achieved by passing fuel through three way valve 44, through ceramic tube 40, through bed 50 of unmixed combustion catalyst, three way valve 44, and finally to vent. The three way valves 44 and 48 periodically switch and air flows through the system in the reverse direction to vent.

During each cycle, the amounts of fuel and air passed through ceramic tube 40 are respectively more than sufficient to completely reduce and oxidize the unmixed combustion catalyst on its surface, whereby tube 40 receives heats to radiate. Consequently each section of tube 6 will radiate heat at a rate in calories per $cm^2$ per second which is the amount of unmixed combustion catalyst per cm² multiplied by the sum of the catalyst's heats of reduction and oxidation and divided by the cycle time. Thus, provided the coating of unmixed combustion catalyst is uniform, tube 40 will provide a highly uniform heat flux.

Since the amount of fuel used in each cycle is more than sufficient to completely reduce the unmixed combustion catalyst in ceramic tube 40 some of the fuel leaves tube 40 unoxidized and is subsequently oxidized in bed 50. The amount of air used is more than sufficient to completely oxidize the fuel. Since the amount of fuel used in each cycle is not large enough to completely reduce both the unmixed combustion catalyst in ceramic tube 40 and that in bed 50, the fuel is completely oxidized.

D. Supplying Heat for Cold Starting

In yet another embodiment, the present invention is a method for supplying startup heat. Many devices and systems have problems with cold starts, particularly those devices and systems requiring some minimum temperature for satisfactory operation. Once such devices and systems are running, the minimum temperature is maintained for satisfactory operation, but starting these devices and systems from initially cold conditions can be difficult and result in low initial efficiencies.

Thus, for example, spark ignition engines and diesel engines can be difficult to start in cold weather. In Arctic regions the difficulty of starting engines once they cool to ambient temperatures can be a severe problem.

Another example relates to the catalyst reactor system used for purifying engine exhaust to reduce the emission of air pollutants by vehicles, particularly automobiles. A majority of vehicles in the United States are equipped with "three way" catalytic converters which both reduce $NO_x$ to nitrogen and oxidize CO and hydrocarbons to $CO_2$ and water. These three way catalyst systems have been developed using both ceramic honeycombs and spherical ceramic beads. In both cases the outermost surfaces are covered with a washcoat of highly porous, high surface area alumina. While the three way catalysts use noble metals, the amounts used are quite small because the noble metal is located only in this thin surface coating. This has the advantage that the time required for the pollutants to diffuse to the noble metal is quite short.

Once the three way catalytic system reaches its normal operating temperature, it removes pollutants very efficiently but it is not effective during the first minute or two after initial start up, when the temperature of the system is much less than its normal operating temperature. Elimination of significant reductions of these "cold start" emissions would provide a significant improvement since "cold start" emissions are responsible for up to 75% of the total air pollutants emitted by automobiles.

In this embodiment the present invention provides methods and systems for supplying heat to ease the problem of cold starting devices and systems. The unmixed combustion catalyst is a readily reduced metal oxide/readily oxidized metal dispersed on a high surface area support such as alumina. High surface area metals such as copper, iron, and nickel are readily oxidized even at very low initial temperatures and that oxidation liberates large amounts of heat. Thus to start a system or device in which cold starting is a problem, one places the unmixed combustion catalyst in the form of a readily oxidized metal in a location such that it is in good thermal contact with the part of the system or device which requires heat. During startup, air is passed through the unmixed combustion catalyst, oxidizing the metal to the metal oxide and generating the necessary heat. Once the system or device is in satisfactory operation, fuel is passed though the unmixed combustion catalyst, reducing it back to the metallic state for the next use.

Figure 3:
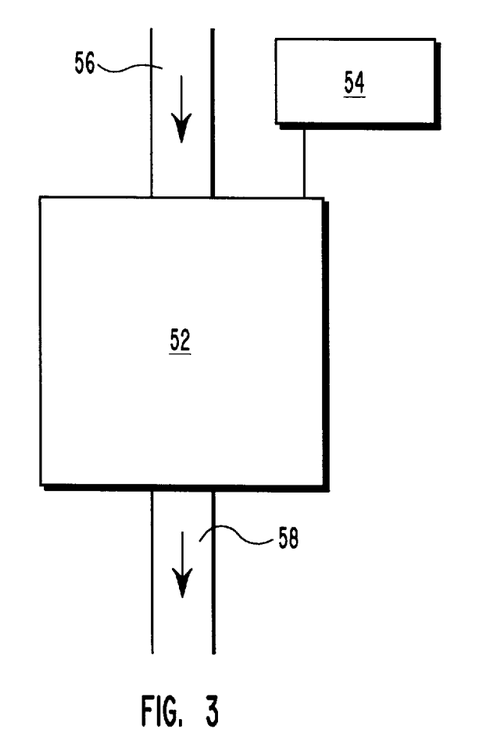
FIG. 3 illustrates a catalyst reactor system for purifying engine exhaust.

One embodiment of a catalytic reactor system is illustrated in FIG. 3 which overcomes the problem of cold starting three way catalysts by mixing the three way catalyst with an unmixed combustion catalyst in a catalytic converter 52. When the driver turns the key to start the car, there would be a delay before the engine starts but an air blowing means for blowing air through the mixture of three way catalyst and unmixed combustion catalyst can immediately start blowing air. An example of a suitable air blowing means is an air pump 54. The unmixed combustion catalyst immediately becomes hot and, since it is in intimate contact with the three way catalyst, this heat is rapidly shared with the three way catalyst. After the engine (not shown) is started, the three way catalyst becomes sufficiently hot and is able to convert the fumes received from an exhaust input 56 and release the converted gas through an exhaust output 58 to significantly decrease pollution.

In another embodiment, a single catalyst particle would perform both functions of a three way catalyst and an unmixed combustion catalyst. The catalyst particle has a noble metal located entirely in a thin wash coat on the outermost surface of each catalyst particle, similar to a typical three way catalyst. The particle, however, is also porous and holds a finely dispersed base metal in its interior. Since the noble metal catalyzes reactions that approach completion in milliseconds while the oxidation of the copper occurs in a few seconds, a single catalyst particle with the noble metal on its outermost surface and the base metal in its interior can satisfactorily function as both a three way catalyst and an unmixed combustion catalyst.

After startup, it is necessary to reduce the unmixed combustion catalyst back to its metallic state. This can be done by means well known to those skilled in the art either during the automobile's normal operation or as part of the shut down operation.

E. Supplying of Heat to Packed Bed Reactor Systems

There are many industrial processes in which it is necessary to supply heat to a packed bed reactor of a packed bed reactor system. Fire is an unsatisfactory method for generating such heat because transferring heat from the exterior of a packed bed to the interior is a slow and difficult process. For some of these industrial processes, however, it is feasible to blend an unmixed combustion catalyst into the packed bed. This allows the heat to be generated where it is needed and thus avoids problems of heat transfer.

One instance in which unmixed combustion can be advantageously used is in the production of hydrogen. It is well known in the art that any of a number of catalysts, including but not limited to nickel and noble metals supported on alumina, can be used to catalyze the reaction of hydrocarbons with water to produce hydrogen. This method of hydrogen production, however, has two problems. First, there is the difficulty that the hydrogen produced is not pure but is in equilibrium with CO, $CO_2$ and $H_2O$ via the reaction $CO+H_2O=CO_2+H_2$. Second, there is the problem that the reaction is strongly endothermic and must be supplied with heat. One of the methods used in the prior art to supply the necessary heat involved causing the reaction to occur on the inside of metal tubes filled with catalyst while passing hot gases from a fire over the outside of these tubes. This approach, however, has the disadvantage that the tubes must tolerate very high temperatures and thus must be made of relatively expensive materials. Since large amounts of these expensive tubes are required to obtain adequate rates of heat transfer, the total cost for this approach is quite high.

CaO has been used in hydrogen production to avoid the need for heat and the undesired carbon dioxide by-product. CaO has the advantage that it can react with $CO_2$ to form $CaCO_3$. This removal of $CO_2$ drives the equilibrium reaction to the right, allowing the production of nearly pure hydrogen. Furthermore, since the formation of $CaCO_3$ is highly exothermic, the heat it generates can supply the heat needed for the reaction of water and the hydrocarbon.

Thus, the use of CaO provided a satisfactory solution to both problems but it introduced a new problem: how to reconvert the $CaCO_3$ back to CaO. The decomposition of $CaCO_3$ to CaO and $CO_2$ requires supplying large amounts of heat which was not accomplished in a satisfactory method by the prior art.

Figure 4:
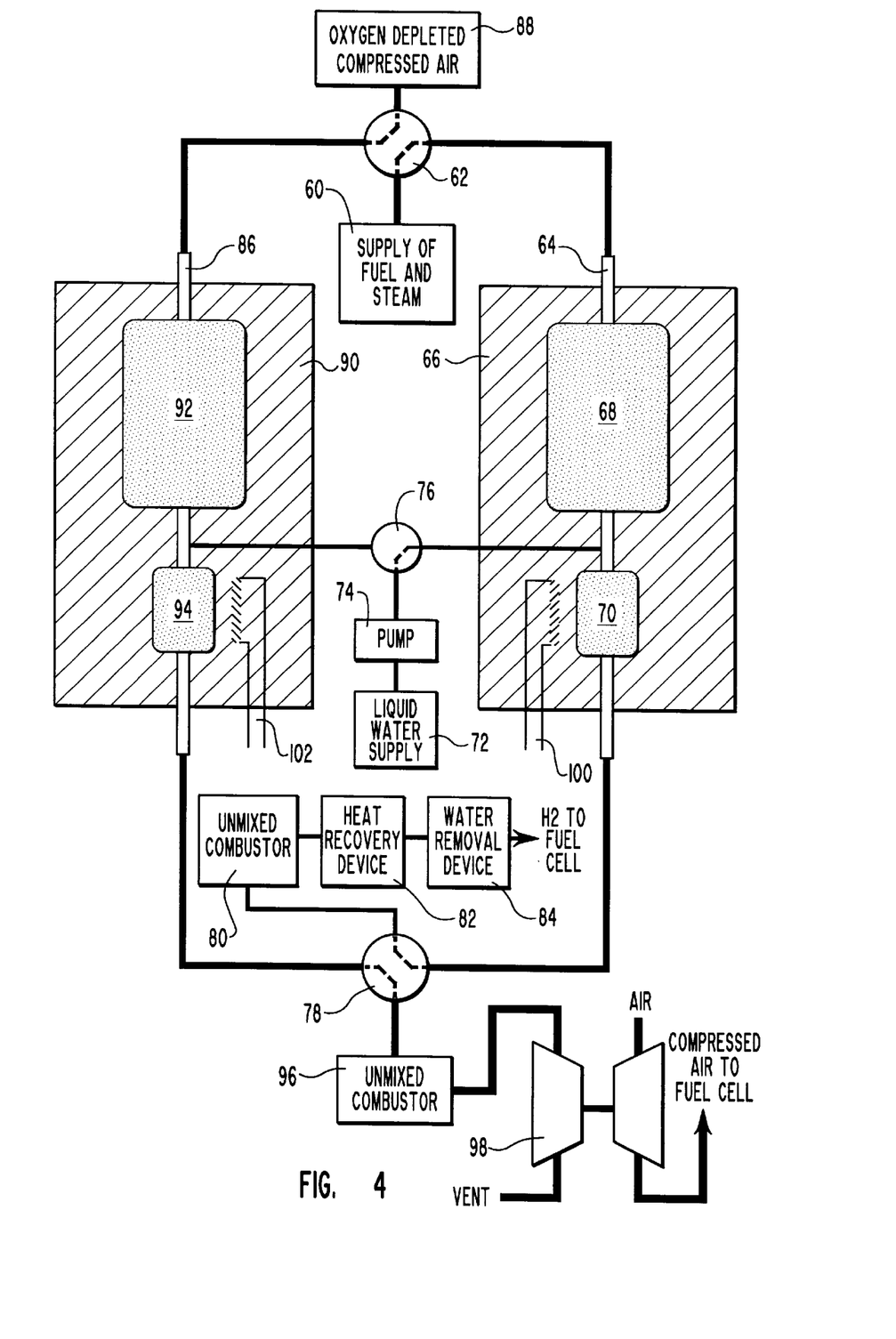
FIG. 4 illustrates a packed bed reactor system for producing high purity hydrogen for use in fuel cells.

The use of unmixed combustion, however, solves this problem. FIG. 4 shows an example of an embodiment of the present invention for the use of unmixed combustion to produce hydrogen for fuel cells. A supply 60 provides a flowing stream of steam and a liquid or gaseous hydrocarbon at a pressure greater than about 60 psig to a four way valve 62. The hydrocarbon or reducing gas can be natural gas, a reducing gas selected from the group consisting of diesel fuel and jet fuel, an emulsion of a hydrocarbon in water or carbon monoxide. This four way valve in turn directs this flowing stream into the top of a reactor 64. Reactor 64 is covered with insulation 66 and has a main section 68 and a smaller section 70. Both main section 68 and smaller section 70 contain a mixture of two catalysts. One of the catalysts is a heat receiver which is a $CO_2$ acceptor selected from the group consisting of calcined limestone, calcined dolomite, and thermally decomposed salts of calcium oxide supported on a porous ceramic. The other catalysts is also supported on a porous ceramic and is preferably selected from the group consisting of copper/copper oxide, iron/iron oxide, nickel/nickel oxide, cobalt and cobalt oxide, and mixtures thereof. The preferred combination is $CaO/CaCO_3$ and Ni/NiO on porous alumina.

Conditions are so adjusted so that the temperature in a main section 68 is in a range from about 600° C. to about 800° C. The steam and hydrocarbon react to form hydrogen through an endothermic chemical reaction. This reaction goes to near completion because CaO reacts with $CO_2$ to from $CaCO_3$. However, the removal of $CO_2$ and of CO is not entirely complete since the equilibrium pressure of $CO_2$ above $CaO/CaCO_3$ has a finite value when the temperature is in a range from about 600° C. to about 800° C.

As the impure hydrogen leaves main section 68, liquid water from a liquid water supply 72 is added to it via a pump 74 and a three way valve 76. The evaporation of this liquid water cools the impure hydrogen and maintains a temperature in smaller section 70 less than about 600° C. and most preferably in a range from about 200° C. to about 550° C. The equilibrium pressure of $CO_2$ above $CaO/CaCO_3$ has a lower value when the temperature is in a range from about 200° C. to about 550° C. than it does in a range from about 600° C. to about 800° C. Consequently, the impure hydrogen becomes substantially pure as it passes through smaller section 70. The purified hydrogen exits reactor 64 via a second four way valve 78, passing through an unmixed combustor 80, a heat recovery device 82, and a water removal device 84. The purified hydrogen then goes to a fuel cell.

During the formation of hydrogen in main section 68 and its purification in smaller section 70, NiO was reduced to Ni. It is also within the scope of the present invention to use any noble metal catalyst.

While reactor 64 is producing hydrogen, $CaCO_3$ in a second reactor 86 is being converted back to CaO. Fuel cells typically operate at superatmospheric pressures, typically in a range from about 15 to about 45 psig. The gas coming away from the anode side of a fuel cell has a nonzero oxygen content but, as compared to air, is depleted of oxygen. Thus the fuel cell provides oxygen depleted compressed air to a supply of oxygen depleted compressed air 88. This oxygen depleted air passes through four way valve 62 to second reactor 86. Second reactor 86 is covered with insulation 90 and has a main section 92 and a smaller section 94. Both main section 92 and smaller section 94 contain a mixture of two catalysts, $CaO/CaCO_3$ and Ni/NiO on porous alumina. The oxidation of the Ni to NiO generates heat which is consumed by the decomposition of the $CaCO_3$ to CaO and $CO_2$, with the $CO_2$ then being swept out of reactor 86 via four way valve 78.

The heat released by oxidizing the unmixed combustion catalyst with the oxygen depleted compressed air is also retained by the oxygen depleted compressed air. The oxygen depleted compressed air is further heated by oxidizing any residual gases containing molecular hydrogen with an additional unmixed combustion catalyst in the unmixed combustor 96 and then expanding it by passing it through a gas turbine such as a turboexpander 98 to generate power. The power drives a turbocompressor to produce compressed air.

The rates of flow of steam, hydrocarbon and oxygen depleted air are mutually adjusted. This adjustment is such that as the decomposition of the $CaCO_3$ in reactor 86 nears completion, the conversion of CaO to $CaCO_3$ in reactor 64 is also approaching completion. When the reactions are completed, four way valves 62 and 78 and three way valve 76 all switch.

When the valve switch occurs, reactor 64 contains hydrogen gas. The oxygen depleted air forces the hydrogen out of reactor 64 through four way valve 78 and through unmixed combustor 96 to turboexpander 98. As the hydrogen passes through unmixed combustor 96, it is oxidized to water. The heat thus produced increases the ability of turboexpander 98 to do work.

Similarly, when the valves switch, reactor 86 contains oxygen depleted air. The steam and hydrocarbon entering reactor 86 forces the oxygen depleted air out of reactor 86 through four way valve 78 and through unmixed combustor 80. While the oxygen depleted air still contains some oxygen, the amount of this oxygen is, on a time average basis, small relative to the amount of hydrogen passing through unmixed combustor 80. The heat produced by the reduction of this small amount of oxygen is added to the heat which heat recovery device 82 can recover. The removal of this small amount of oxygen by unmixed combustor 80 purifies the hydrogen going to the fuel cell.

Heat is required to start the embodiment of the present invention depicted in FIG. 4 when it is first used. Heat may be supplied in a number of ways known to those skilled in the art. For example, a startup heater 100 and a second startup heater 102 can provide the necessary startup heat. When the embodiment of the present invention depicted in FIG. 4 is shut down and allowed to cool after being used, the shutdown procedure can involve using both reactors 64 and 86 to produce hydrogen. When the system is restarted, both reactors will contain Ni and $CaCO_3$. The oxidation of finely divided nickel metal occurs readily at room temperature and is strongly exothermic. Thus simply passing air first through one reactor then through the other will heat them both to operating temperature.

The techniques used to impart heat to the endothermic reaction occurring during the steam reforming of a hydrocarbon to produce hydrogen can also be applied to other endothermic reactions, such as the steam reforming of a hydrocarbon fuel to produce hydrogen, the decomposition of ammonia to hydrogen and nitrogen, the reforming of petroleum hydrocarbons, and the decomposition of methanol.

F. Supplying of Heat to an Oil Shale Retort System

Figure 5:
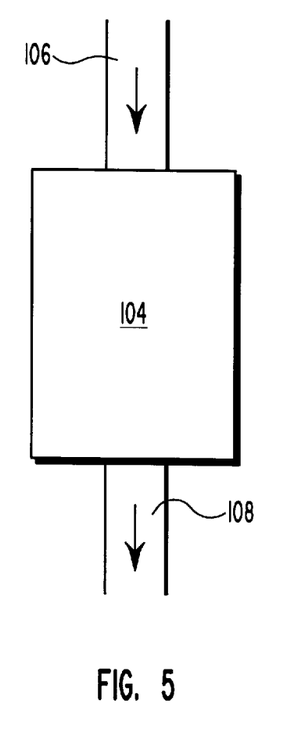
FIG. 5 illustrates a shale retort system to decompose organic matter.

It is well known in the art to recover oil from oil shale by retorting, i.e., by heating the shale rock so as to decompose the organic matter it contains to gases, oil vapors and char. FIG. 5 depicts an oil shale retort system wherein shale rock enters a retort bed 104 via an inlet 106 and is placed in thermal contact with an unmixed combustion catalyst in a bed retort 104. Heat is supplied by allowing gas, the oil vapors, or mixtures thereof to contact the unmixed combustion catalyst whereby oxidation occurs. This oxidation produces $CO_2$. CaO is preferably present and in thermal contact with the oil shale whereby the heat liberated by the exothermic reaction $CaO+CO_2=CaCO_3$ contributes to the heating of the oil shale. The unmixed combustion catalyst is preferably Cu/CuO.

EXAMPLES OF THE PRESENT INVENTION

The following examples illustrate use of a material which in its reduced state is readily oxidized and which in its oxidized state is readily reduced as a means of oxidizing fuel and effectively delivering the heat thus produced to a use. These examples are intended to be purely exemplary of the use of the invention and should not be viewed as limiting the scope of the present invention.

Example 1

Figure 6:
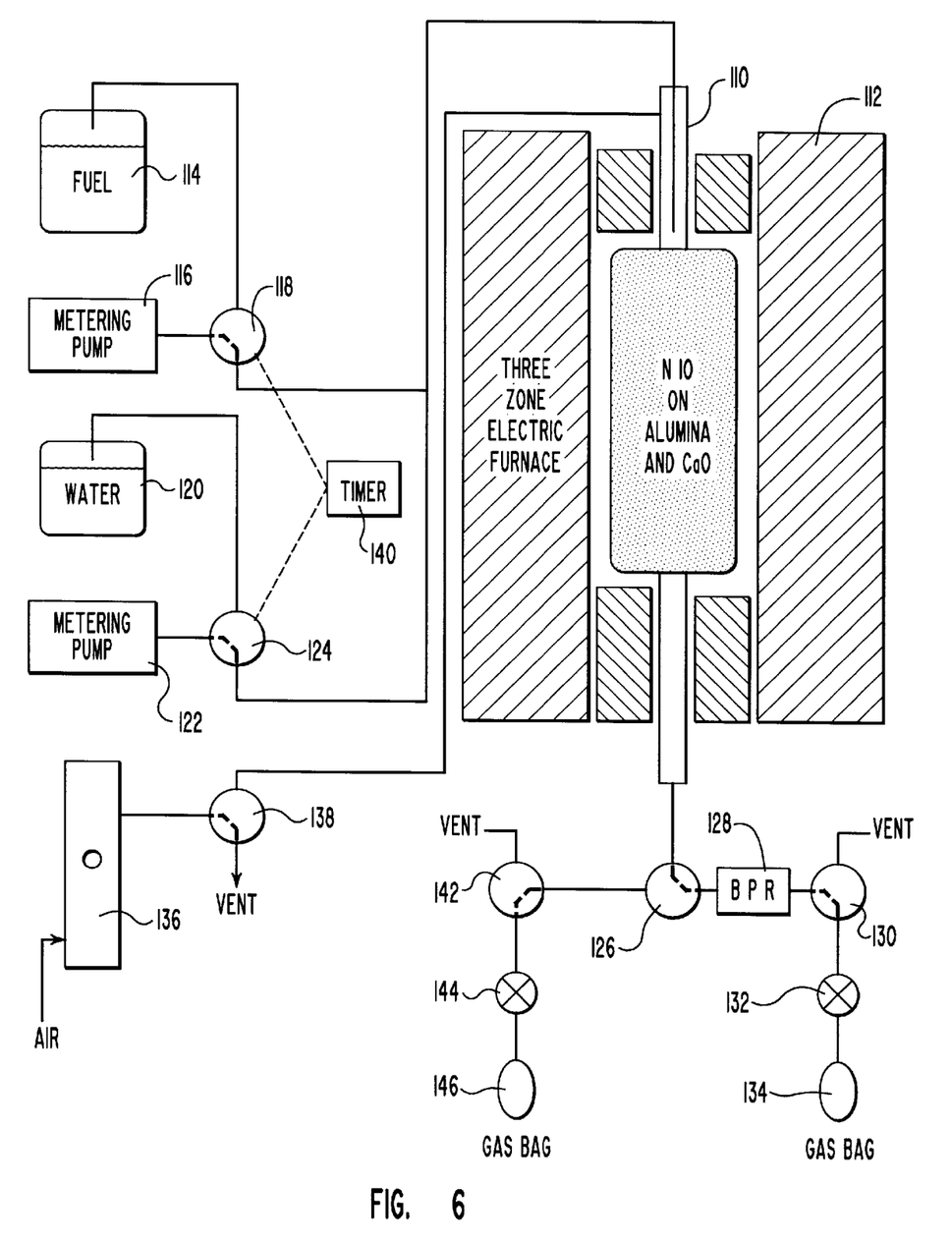
FIG. 6 illustrates a packed bed reactor system for demonstrating the usefulness of unmixed combustion to produce hydrogen.

The system shown in FIG. 6 was used to demonstrate, on a laboratory scale, the advantages and limitations of the present invention for generating hydrogen. In this experimental arrangement, a reactor 110 is held within a three zone electric furnace 112. Reactor 110 receives fuel into the top of reactor 110 from a fuel supply 114 via a pump 116 and through a three way valve 118. Water is received into the top of reactor 110 by a water supply 120 via a pump 122 and through a three way valve 124.

Reactor 110 had an internal volume of 500 cc and contained a mixture of 131.5 grams of $CaCO_3$ which had been calcined to CaO and 223 grams of 21.1 weight percent nickel oxide on high surface area alumina. The water and liquid hydrocarbon trickled down, and vaporized in reactor 110. The hydrocarbon reacted with the NiO reducing it to Ni. The Ni in turn acted as a catalyst for the steam reforming of the hydrocarbon and water into a mixture of CO, $H_2$ and $CO_2$. While this reaction is highly endothermic, the reaction of the CaO with $CO_2$ to form $CaCO_3$ is highly exothermic. The exothermicity of the latter reaction balanced the endothermicity of the former and the overall reaction process was slightly on the exothermic side of thermoneutral.

Because of the water gas shift reaction $CO+H_2O=H_2+CO_2$, CO was in equilibrium with $CO_2$. Consequently removal of $CO_2$ by reaction with the CaO also removed the CO, driving the system toward the production of hydrogen which, on a dry basis, was relatively pure.

The hydrogen thus produced left the reactor via an exit three way valve 126, passed through back pressure regulator 128, and went to vent via three way valve 130. Samples of the hydrogen for gas chromatograph analysis were taken by switching three way valve 130 so that the hydrogen flowed through valve 132 into gas bag 134.

While the hydrogen was being produced, low pressure air flowed through rotameter 136, three way valve 138 and went to vent. At periodic intervals, timer 140 switched three way valves 118, 124, 126, and 138. This caused the flows of fuel and water from pumps 116 and 122 to return to fuel supply 114 and water supply 120 and caused the flow of low pressure air to pass through reactor 110, leaving via valve 126 and going to vent via three way valve 142. Samples for gas chromatograph analysis of the air leaving the reactor were taken by switching three way valve 142 so that the air flowed through valve 144 into gas bag 146.

Passing air through the reactor caused the nickel to oxidize to nickel oxide and caused the $CaCO_3$ to decompose to CaO and $CO_2$. Since the former is a strongly exothermic reaction, the heat it supplies allows the latter, strongly endothermic, reaction to occur.

Example 2

Hydrogen was produced in this series of experiments by slightly modifying the system illustrated in FIG. 6. The system was modified by replacing metering pump 13 and liquid fuel source 11 with a rotameter and a cylinder of carbon monoxide gas in order to convert carbon monoxide by steam reforming. The reactor was preconditioned by flowing air through the reactor overnight at 700° C. The experiments conditions included a temperature of 700° C. and pressure of 4 atm. The input rate for CO was 0.060 moles/min and the input rate of the liquid water was 2.39 cc/min. The samples were measured at five minute intervals.

The results of this series of experiments are shown in Table 1. Table 1 shows the dry basis gas chromatograph analysis of the gases going out of the reactor. Table 1 also includes a column labeled $\Sigma CO/CaO$ indicating the ratio of the number of moles of CO input to the reactor divided by the number of moles of CaO initially present. As shown in Table 1, the percentage of hydrogen in the output gas was initially relatively high. As the reaction proceeded, however, $\Sigma CO/CaO$ approached one and the ability of the remaining CaO to capture $CO_2$ declined. Consequently the percentage of hydrogen in the output gas decreased. This shows the necessity of periodically regenerating the CaO.

TABLE 1

| SAMPLE | $H_2$ | $CH_4$ | CO | $CO_2$ | $\Sigma CO/CaO$ |
| --- | --- | --- | --- | --- | --- |
| 1 | 77.4% | 12.2% | 1.9% | 8.5% | 0.229 |
| 2 | 80.6% | 9.9% | 0.65% | 8.8% | 0.458 |
| 3 | | | Not analyzed | | |
| 4 | 54.8% | 5.6% | 14.1% | 25.5% | 0.916 |
| 5 | 39.7% | 2.46% | 17.1% | 40.8% | 1.146 |
| 6 | 42.4% | 3.40% | 14.7% | 30.4% | 1.374 |
| 7 | 40.1% | 5.4% | 16.2% | 38.4% | 1.603 |

Example 3

After the series of experiments in Example 2 were completed, the system depicted in FIG. 6 was again modified in order to steam reform methane. The carbon monoxide cylinder used in Example 2 was replaced with a cylinder of methane and the CaO was regenerated. The reactor was preconditioned by flowing air through the reactor at a temperature of 700° C. at 6 l/min for 3.5 hours. The experiment conditions included a temperature of 700° C. and pressure of 7 atm. The input rate for $CH_4$ was 2164 cc/min and the input rate of the liquid water was 1.5 cc/min. The result of this experiment indicate that the present invention is also useful to convert methane to hydrogen.

TABLE 2

| Gases | $H_2$ | $CH_4$ | CO | $CO_2$ |
|---|---|---|---|---|
| Analysis of Output Gases | 77.1% | 20.0% | 2.55% | 0.32% |

Example 4

The system depicted in FIG. 6 was modified again in order to steam reform diesel fuel. The CaO was regenerated and diesel fuel was steam reformed with the results shown in Table 3. The experiment conditions included a temperature of 700° C. and pressure of 8 atm. The input rate for diesel fuel was 1.11 cc/min and the input rate of the liquid water was 1.5 cc/min. The samples were measured at intervals as indicated in Table 3.

The results of this experiment indicates that the present invention is also useful to convert diesel fuel to hydrogen. The percentage of hydrogen in the gases coming out of the reactor was initially high, but declined as the CaO became exhausted as it did when methane was used.

TABLE 3

| SAMPLE | TIME INTERVAL | $H_2$ | $CH_4$ | CO | $CO_2$ |
|---|---|---|---|---|---|
| 1 | 8 minutes | 93% | 2.75% | 0.51% | 3.71% |
| 2 | 13 minutes | 87.4% | 8.63% | 2.98% | 0.97% |
| 3 | 20 minutes | 63.1% | 8.76% | 13.5% | 14.6% |
| 4 | 30 minutes | 62.4% | 8.76% | 13.35% | 15.49% |
| 5 | 40 minutes | 66.0% | 7.9% | 12.2% | 13.9% |

Example 5

A series of experiments were conducted with the system shown in FIG. 6 to regenerate the $CaCO_3$ back to CaO by passing air through the reactor. The reactor was not preconditioned for this series of experiments. The experiment conditions included a temperature of 700° C. and pressure of 1 atm. The input rate for air was 320 cc/min. A wet test meter was used to measure the total volume of gas going out of the reactor and the $CO_2$ content of that gas was determined by gas chromatograph at intervals.

The results tabulated in Table 4 show the regeneration of the CaO is rapid process due to the heat provided by the oxidation of the Ni since the $CO_2$ came out of the reactor in large amounts at the start of the process and then sharply declined.

TABLE 4

| GAS VOL. PASSED THROUGH REACTOR | PERCENT OF $CO_2$ |
|---|---|
| 6.615 Liters | 9.4% |
| 12.0 Liters | 0.81% |
| 15.5 Liters | 0.19% |
| 19.0 Liters | 0.12% |

Example 6

Another experiment with the FIG. 6 setup was done at 700° C., 8 atm. and with inputs to the reactor of commercial diesel fuel at 1.11 cc/min and liquid water at 1.5 cc/min. A sample was taken at 13 minutes and analyzed with a Kitagawa gas detector tube. No stain was visible after passage of a recommended volume of sample gas for 1 to 30 ppm sensitivity to $H_2S$. Passing ten times the recommended volume of sample gas also failed to produce an observable stain. This total absence of a stain shows that commercial diesel fuel yielded hydrogen with an $H_2S$ concentration of less than 0.1 ppm.

Example 7

Another experiment was done in which diesel fuel at 1.11 cc/min, liquid water at 1.5 cc/min and air at 6050 cc/min were put alternately through the reactor for periods of 10 minutes and 30 minutes respectively for a total time of 96 hours. The reactor temperature during this time was 700° C. An experiment was then done at 700° C., in which air at 6050 cc/min. was passed through the reactor for 30 minutes following which diesel fuel at 1.11 cc/min and liquid water at 1.5 cc/min and a pressure of 8 atm. were passed through the reactor. Gas chromatograph analysis of the gases coming out of the reactor showed them to be 93.8% hydrogen. This result indicates that the catalyst can be used for a substantial number of cycles.

Example 8

In another set of experiments, commercial diesel fuel was used without addition of thiophene and with enough added thiophene to make the sulfur content 2000 ppm by weight. Experiments were then done with these diesel fuels in which the fuel and water were input to the reactor at 1.11 cc/min and 1.5 cc/min respectively with a reactor temperature of 700° C. and a pressure of 8 atm. The output gases were analyzed for $H_2$, $CH_4$, CO and $CO_2$ by gas chromatograph and for $H_2S$ with Kitagawa detector tubes. The results of these experiments are shown in Table 5. This illustrates that the present invention can produce hydrogen of very low H2S content even when the input fuel has a high sulfur content. This is a major advantage since hydrogen that is to be used in fuel cells needs a very low $H_2S$ content.

TABLE 5

| | $H_2$ | $CH_4$ | CO | $CO_2$ | $H_2S$ ppm |
|---|---|---|---|---|---|
| Fuel without Thiophene | 90.89% | ND* | 0.78% | 8.35% | — |
| Fuel with added Thiophene | 96.1% | ND* | 0.330% | 3.55% | 5 |

*ND = the methane present was too small for determination.

Example 9

Figure 7:
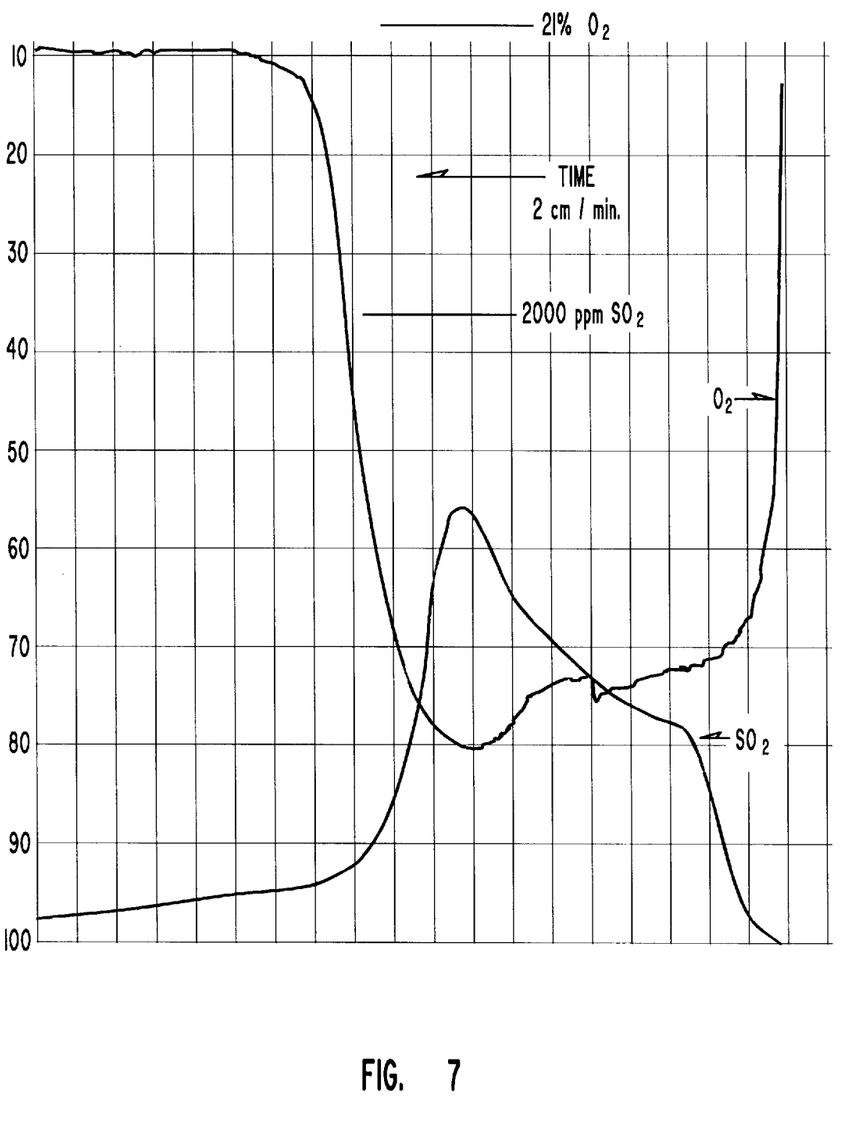
FIG. 7 shows the results from Experiment 9 indicating the usefulness of the present invention with fuels containing sulfur.

After the experiments conducted in Example 8, the setup shown FIG. 6 was modified for another experiment. The gases coming out of the reactor were sent to a Thermoelectron Pulsed Fluorescent $SO_2$ analyzer and a Teledyne $O_2$ meter. Air was passed through the reactor at a rate of 6050 cc/min., 700° C., and 1 atm. FIG. 7 shows the recorded outputs of the $SO_2$ and $O_2$ analyzers. This illustrates that when the present invention is used to produce hydrogen from a fuel which contains sulfur, the sulfur in the fuel is retained in the reactor during the hydrogen production part of the cycle and is discharged as $SO_2$ during the regeneration step.

Example 10

In this experiment the setup shown in FIG. 6 was modified so that the gases coming out of the reactor were sent to a second reactor. This second reactor was operated at 510° C. and 8 atm. and served to further purify the hydrogen produced in the first reactor. Diesel fuel containing 2000 weight percent sulfur was input to the first reactor at 1.11 cc/min. as was water at 1.5 cc/min. Measurement of the gases coming out of the second reactor with a Kitagawa gas detector tube showed no detectable $H_2S$, i.e., less than 1.0 ppm. Measurement with a Thermoelectron Gas Filter Correlation CO Analyzer showed that only 23.4 ppm CO remained in the gases after passage through the purification reactor. This illustrates that passage of the hydrogen produced in a reaction zone at a higher temperature, through a reaction zone at a lower temperature, can greatly improve the purity of the hydrogen. Since some types of fuel cells can not tolerate CO or $H_2S$ unless their concentrations are kept to very low levels, it is an important advance in the art.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A method of generating heat within a packed bed in a reactor for carrying out an endothermic reaction in the packed bed, the method comprising the steps of:
   (a) providing a packed bed in a reactor, the packed bed comprising a heat receiver and a catalyst for the unmixed combustion of fuel and air, the catalyst mixed and in intimate contact with the heat receiver, the catalyst being readily oxidized when in a reduced state and readily reduced when in an oxidized state, wherein the catalyst is selected from the group consisting of nickel/nickel oxide, silver/silver oxide, copper/copper oxide, cobalt/cobalt oxide, tungsten/tungsten oxide, manganese/manganese oxide, molybdenum/molybdenum oxide, strontium sulfide/strontium sulfate, barium sulfide/barium sulfate, and mixtures thereof;
   (b) contacting the catalyst in the packed bed, to release heat which is consumed by an endothermic reaction in the packed bed, alternately with:
      (i) a reducing gas to reduce the catalyst and thereby oxidize the reducing gas; and
      (ii) an oxidizing gas containing molecular oxygen in a sufficient quantity to completely oxidize the catalyst and thereby remove the molecular oxygen from the oxidizing gas.

2. The method as defined in claim 1, wherein the oxidizing gas is selected from the group consisting of air, air mixed with combustion products, and air from which a portion of oxygen has been removed.

3. The method as defined in claim 1, wherein the catalyst is silver/silver oxide and has a temperature in a range from about 200° C. to about 700° C.

4. The method as defined in claim 1, wherein the catalyst is copper/copper oxide and has a temperature in a range from about 200° C. to about 1000° C.

5. The method as defined in claim 1, wherein the catalyst has a temperature in a range from about 500° C. to about 1200° C. and is selected from the group consisting of cobalt/cobalt oxide, nickel/nickel oxide, and mixtures thereof.

6. The method as defined in claim 1, wherein the catalyst has a temperature in a range from about 800° C. to about 1300° C. and is selected from the group consisting of tungsten/tungsten oxide, manganese/manganese oxide, molybdenum/molybdenum oxide, and mixtures thereof.

7. The method as defined in claim 1, wherein the catalyst has a temperature in a range from about 600° C. to about 1200° C. and is selected from the group consisting of strontium sulfide/strontium sulfate, barium sulfide/barium sulfate, and mixtures thereof.

8. The method as defined in claim 1, wherein the catalyst is supported on a porous ceramic.

9. The method as defined in claim 1, wherein the catalyst is supported on a porous ceramic selected from the group consisting of silica, alumina, magnesia and mixtures thereof.

10. The method as defined in claim 1, wherein the catalyst is supported on alumina.

11. The method as defined in claim 1, wherein the heat receiver includes a sorbent material.

12. The method as defined in claim 11, wherein the sorbent material is a sorbent for carbon dioxide.

13. The method as defined in claim 11, wherein the sorbent is a sorbent for water.

14. The method as defined in claim 11, wherein the sorbent is a sorbent for organic vapor.

15. The method as defined in claim 11, wherein the sorbent comprises calcium oxide.

16. The method as defined in claim 15, wherein the catalyst is selected from the group consisting of strontium sulfide/strontium sulfate, barium sulfide/barium sulfate, and mixtures thereof.

17. The method as defined in claim 1, wherein the endothermic reaction is the decomposition of ammonia to hydrogen and nitrogen.

18. The method as defined in claim 1, wherein the endothermic reaction is the reforming of petroleum hydrocarbons.

19. The method as defined in claim 1, wherein the endothermic reaction is the decomposition of methanol.

20. The method as defined in claim 1, wherein the endothermic reaction is the steam reforming of a hydrocarbon to produce hydrogen.

21. The method as defined in claim 1, wherein the endothermic reaction is the steam reforming of a hydrocarbon fuel to produce hydrogen.

22. The method as defined in claim 1, wherein the endothermic reaction is the decomposition of the heat receiver, the heat receiver comprising a $CO_2$ acceptor selected from the group consisting of calcined limestone, calcined dolomite, and thermally decomposed salts of calcium oxide supported on a porous ceramic, and wherein the catalyst is supported on a porous ceramic and is selected from the group consisting of copper/copper oxide, nickel/nickel oxide, cobalt/cobalt oxide, and mixtures thereof.

23. The method as defined in claim 1, wherein the catalyst is at a temperature in a range from about 600° C. to about 800° C. and under a pressure greater than about 60 psig.

24. The method as defined in claim 1, wherein the catalyst is in contact with a noble metal catalyst.

25. The method as defined in claim 1, wherein the reducing gas is natural gas.

26. The method as defined in claim 1, wherein the reducing gas is produced by vaporizing a liquid hydrocarbon.

27. The method as defined in claim 1, wherein the reducing gas is produced by vaporizing a liquid selected from the group consisting of diesel fuel and jet fuel.

28. The method as defined in claim 1, wherein the reducing gas is produced by vaporizing an emulsion of a hydrocarbon in water.

29. The method as defined in claim 1, wherein the catalyst and the heat receiver are in a reactor having a main section and a smaller section, the temperature in the main section being in a range from about 600° C. to about 800° C. and the temperature in the smaller section being less than about 600° C., wherein a gas exiting the smaller section is substantially purified.

30. The method as defined in claim 1, wherein the oxidizing gas is oxygen depleted compressed air from a fuel cell, and the heat receiver includes $CaCO_3$, wherein the heat released by oxidizing the catalyst with the oxygen depleted compressed air is also retained by the oxygen depleted compressed air, the method further comprising the steps of:

heating the oxygen depleted compressed air by oxidizing any residual gases containing molecular hydrogen with an additional catalyst for the unmixed combustion of fuel and air, passing the oxygen depleted compressed air through a turboexpander to generate power, and driving a turbocompressor with the power from the turboexpander to produce compressed air.

31. A method of generating heat within a packed bed in a reactor for carrying out an endothermic chemical reaction in the packed bed, the method comprising the steps of:

(a) providing a packed bed in a reactor, the packed bed comprising a heat receiver and a catalyst for the unmixed combustion of fuel and air, the catalyst mixed and in intimate contact with the heat receiver, the catalyst being readily oxidized when in a reduced state and readily reduced when in an oxidized state, wherein the catalyst is selected from the group consisting of nickel/nickel oxide, silver/silver oxide, copper/copper oxide, cobalt/cobalt oxide, tungsten/tungsten oxide, manganese/manganese oxide, molybdenum/molybdenum oxide, strontium sulfide/strontium sulfate, barium sulfide/barium sulfate, and mixtures thereof;

(b) contacting the catalyst in the packed bed, to release heat which is consumed by an endothermic chemical reaction comprising the steam reforming of a hydrocarbon containing sulfur to produce hydrogen in the packed bed, alternately with:

(i) a hydrocarbon gas to reduce the catalyst and thereby oxidize the hydrocarbon gas, resulting in production of hydrogen; and (ii) an oxidizing gas containing molecular oxygen in a sufficient quantity to completely oxidize the catalyst and thereby remove molecular oxygen from the oxidizing gas;

(c) retaining sulfur in the reactor during the catalyst reducing step and the production of hydrogen; and (d) discharging the sulfur from the reactor in the form of $SO_2$ during the catalyst oxidizing step.

32. A method of generating heat within a packed bed in a reactor for carrying out an endothermic reaction in the packed bed, the method comprising the steps of:

(a) providing a packed bed in a reactor, the packed bed comprising a heat receiver and a catalyst for the unmixed combustion of fuel and air, the catalyst mixed and in intimate contact with the heat receiver, the catalyst being readily oxidized when in a reduced state and readily reduced when in an oxidized state, wherein the catalyst is selected from the group consisting of silver/silver oxide, cobalt/cobalt oxide, tungsten/tungsten oxide, molybdenum/molybdenum oxide, strontium sulfide/strontium sulfate, barium sulfide/barium sulfate, and mixtures thereof;

(b) contacting the catalyst in the packed bed, to release heat which is consumed by an endothermic reaction in the packed bed, alternately with:

(i) a reducing gas to reduce the catalyst and thereby oxidize the reducing gas; and (ii) an oxidizing gas containing molecular oxygen in a sufficient quantity to completely oxidize the catalyst and thereby remove the molecular oxygen from the oxidizing gas.

* * * * *